United States Patent [19]

Jones

[11] Patent Number: 4,631,984
[45] Date of Patent: Dec. 30, 1986

[54] SPEED-SENSITIVE SHIFT CONTROL

[75] Inventor: Michael E. Jones, Wooster, Ohio

[73] Assignee: Eaton Corporation, Cleveland, Ohio

[21] Appl. No.: 714,322

[22] Filed: Mar. 21, 1985

[51] Int. Cl.$^4$ ............................................. B60K 41/04
[52] U.S. Cl. .................................. 74/878; 74/483 R; 74/477
[58] Field of Search ...................... 74/878, 483 R, 477, 74/529, 476

[56] References Cited

U.S. PATENT DOCUMENTS

| | | | |
|---|---|---|---|
| 3,779,096 | 12/1973 | Hurst | 74/476 |
| 3,894,443 | 7/1975 | Beig et al. | 74/477 X |
| 4,068,537 | 1/1978 | Wolfe | 74/477 |
| 4,163,398 | 8/1979 | Johnston | 74/529 |
| 4,267,745 | 5/1981 | Edwards | 74/476 |
| 4,380,177 | 4/1983 | Reinecke et al. | 74/477 X |
| 4,441,379 | 4/1984 | Malkowski et al. | 74/477 |
| 4,444,072 | 4/1984 | Grimes et al. | 74/526 X |
| 4,534,237 | 8/1985 | Carosino | 74/476 |

FOREIGN PATENT DOCUMENTS 0046845 3/1982 European Pat. Off. ............. 74/878
0204976 12/1983 Fed. Rep. of Germany ........ 74/476

*Primary Examiner*—Lawrence Staab
*Assistant Examiner*—Martin G. Belisario
*Attorney, Agent, or Firm*—C. H. Grace; A. E. Chrow

[57] ABSTRACT

Disclosed is a shift control (60) for operating an automatic engine transmission from a remote location preferably by means of a flexible cable (12) that is adapted to prevent an operator from shifting from and through a neutral position (N) while the engine speed is above a predetermined value. Shift control (60) has a control arm (2) that when moved in opposite directions in a plane along a frame (3) to various gear positions is operable to rotate a plate (26) having an arcuate extension (28) having an opening (32) therethrough through which a pin (34) is able to extend and prevent movement of arm (2) when the engine speed is above the predetermined value and which in a retracted condition preferably maintains a sliding contacting relationship with extension (28). Pin (3) is preferably an extension of the core of an electrical actuator such as solenoid (18) secured to frame (3) which is powered through an electrical conductor (22) from a suitable power source (V) and which is actuated and deactuated according to whether the engine speed sensed by speed sensing means (44) is above or below a predetermined speed value by means of comparator means (46).

5 Claims, 7 Drawing Figures

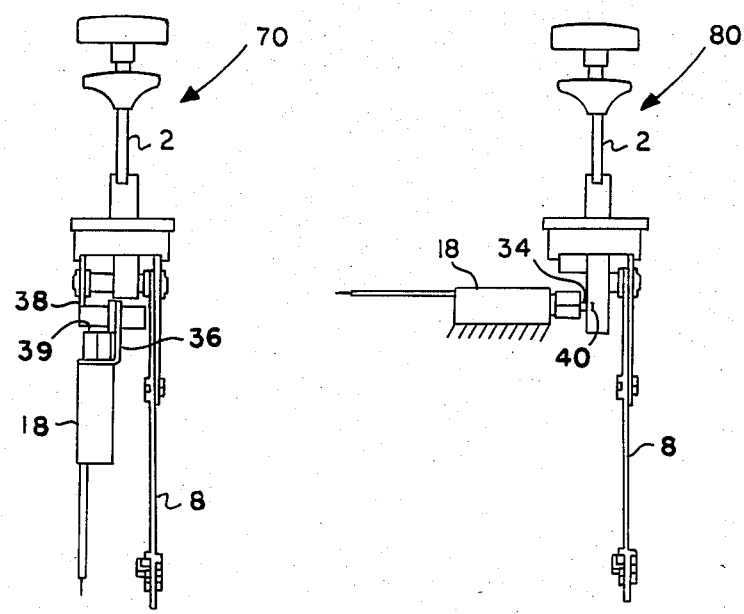
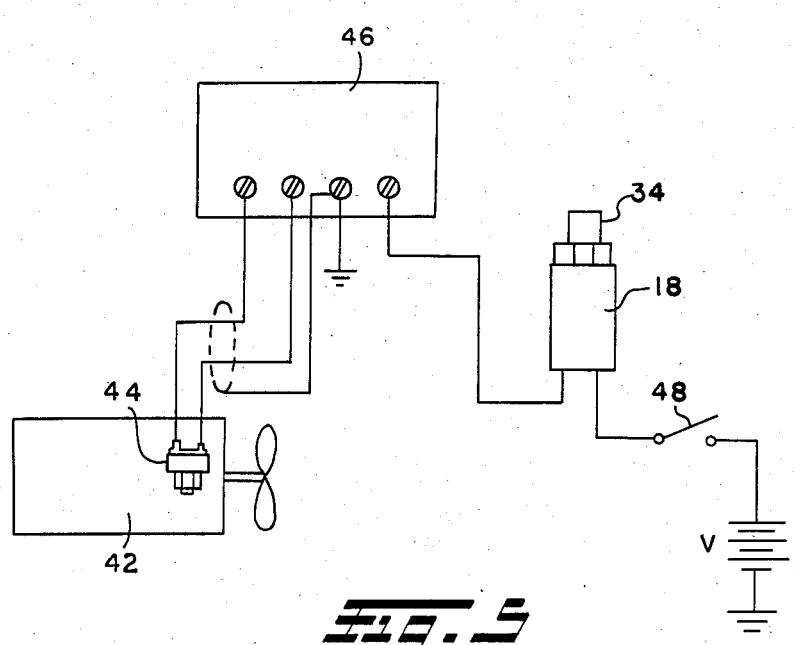

SPEED-SENSITIVE SHIFT CONTROL

INTRODUCTION

This invention relates generally to a shift control for shifting between gears of an automatic transmission and more particularly to a shift control that prevents shifting from and through a neutral position to a gear position of the transmission when the engine speed is above a predetermined value.

BACKGROUND OF THE INVENTION

A variety of hand actuated mechanical devices have been devised over the years to lock the shifter arm of an engine transmission shift control at one or more desired positions. Examples of such devices are disclosed in U.S. Pat. No. 2,895,347 which discloses a hand operated friction device and in U.S. Pat. Nos. 2,703,499 and 3,727,482 which respectively disclose spring loaded tilting mechanisms and in U.S. Pat. No. 1,629,666 which discloses a hand-releasable pin for locking the shifter control at prescribed indentations in a locking arm, the disclosures all of which are included herein by reference.

The problem with the above devices and other such hand actuated devices is that they rely upon an act by the operator for their respective operation and are not completely independent of the operator which in many instances may be particularly desirable. One such instance is the need to protect the gear train of an engine transmission from shock and wear and possible damage from shifting from and through neutral to engage a particular gear while the engine speed is relatively high. Such shifting arises, for example, when refuse haulers make frequent stops at short distances and attempt to shift from and through neutral while the vehicle engine is running at relatively high speed.

In view of the above, a need exists to automatically prevent an operator from shifting an automatic transmisson from and through netural to engage a gear above a predetermined engine speed value to prevent undue wear and/or damage to the transmission yet enables shifting from and through netural to engage a gear of the transmission when the engine speed falls below the predetermined engine speed value.

SUMMARY OF THE INVENTION

Accordingly, it is an object of this invention to provide a speed-sensitive shift control for shifting between various gears of an engine transmission.

It is another object of this invention to provide a speed-sensitive shift control that automatically prevents an operator from shifting from and through neutral to engage a gear of the transmission when the engine speed is above a predetermined value yet automatically enables the operator to make the shift when the engine speed is below the predetermined value.

It is yet another object of this invention to provide a speed-sensitive shift control for shifting between various gears of an engine transmission that is adapted to protect the tranmsmission from undue wear and/or damage by automatically preventing the operator from shifting from and through neutral to engage a gear of the transmission while the engine speed is above a predetermine value and yet automatically enables the operator to shift from and through neutral to engage a gear of the transmission while the engine speed is below the predetermined value.

BRIEF DESCRIPTION OF THE FIGURES

FIG. 3 is an end view of another embodiment of the speed-sensitive shift control of the invention;

FIG. 4 is an end view of another embodiment of the speed-sensitive shift control of the invention; and FIG. 5 is a block diagram of an embodiment of electrical circuitry suitable for controlling the speed-sensitive shift control of the invention.

DESCRIPTION OF SOME PREFERRED EMBODIMENTS

Figure 1A:
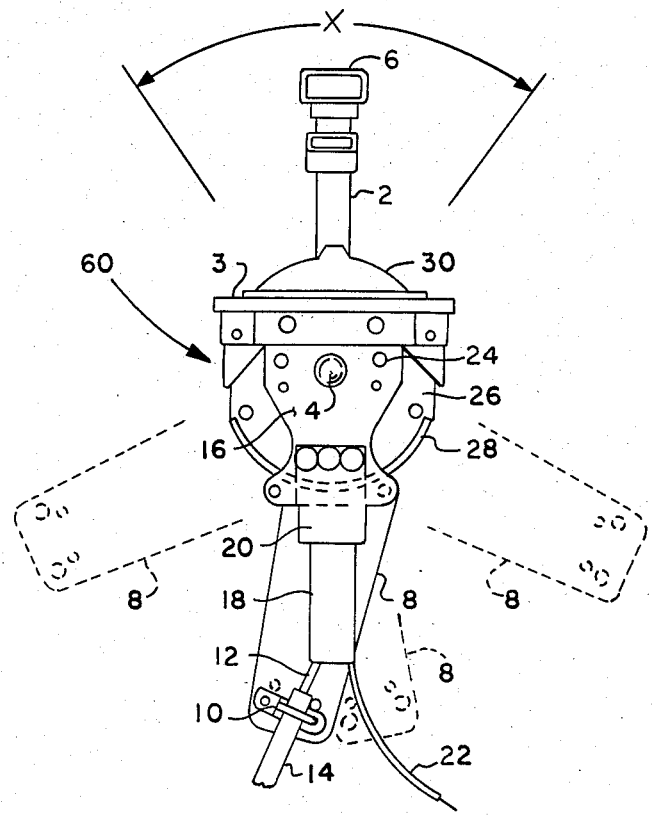
FIG. 1A is a side elevation view of an embodiment of the speed-sensitive shift control of the invention.
Figure 1B:
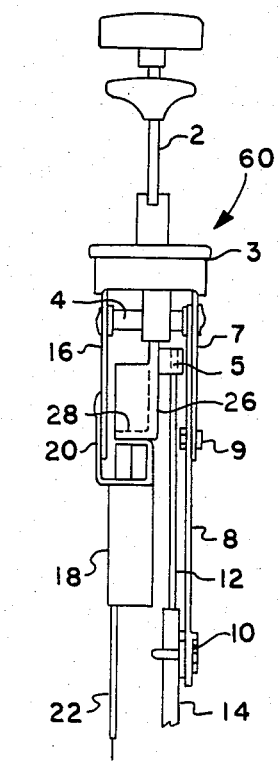
FIG. 1B an end view of the shift control of FIG. 1A.

Speed-sensitive shift control 60 of FIGS. 1A and 1B has a speed-selecting control arm 2 that is provided at its upper end with a handle 6 enabling an operator to position arm 2 back and forth a distance "x" along a frame 3 to various gear positions, including a neutral position, of an engine transmission. As shown in FIG. 1A, arm 2 is preferably pivotably mounted to rotate in opposite directions in a plane about pivot 4. Pivot 4 is suitably mounted between front plate 16 and back plate 7 as shown in FIG. 1B.

Arm 2 is operably connected to the transmission by means of flexible cable 12 that is secured at one end to plate 26 by a suitable connector 5. Cable 12 is slidingly engaged within outer protective jacket 14 that is secured to plate 8 by suitable clamping means 10. Plate 8 is secured to plate 7 by suitable bolts 9 which enable the orientation of plate 8 with respect to plate 7 to be changed as shown for example by the dashed positions of plate 8. Plate 8 is positioned to accommodate the direction at which cable 12 enters the region of control 60. Although arm 2 is preferably connected to the transmission by means of cable 12 as previously described, it is to be understood that any suitable means of operably connecting arm 2 to the engine transmission that enables an operator to select gears of the transmission for the control thereof by positioning arm 2 along the frame is considered within the scope of the invention. Cable 12 and jacket 14 comprise a push-pull cable assembly well known to those skilled in the art. Movement of arm 2 in opposite directions causes cable 12 to correspondly move in opposite axial directions within jacket 14 to control the transmission in the manner desired.

Shift control 60 is provided with releasable locking means in the form of previously described plate 26 that rotates in opposite directions about pivot 4 as the operator moves arm 2 in opposite directions as previously described and as hereinafter described in greater detail with respect to FIGS. 2A and 2B. Plate 26 is provided with an arcuate extending section 28 that extends in a direction generally transverse to the plane of rotation of plate 26. Section 28 is provided with an opening 32 as shown in FIGS. 2A and 2B and the combination of plates 26 and 28 and opening 32 comprise a releasable locking member which in conjunction with pin 34 that is operably controlled by an electrical actuator means such as solenoid 18 hereinafter described of which pin 34 is preferably an extension of the core thereof, provides a means of inhibiting movement of arm 2 through and from neutral to a gear position when the engine speed is above a predetermined value.

Solenoid 18 is connectable to a suitable power source by means of insulated electrical wire 22 and is fixedly secured to plate 16 by plate 20 as shown in FIGS. 1A and 1B.

Since plate 16 is fixedly secured to frame 3, neither plate 16 nor plate 20 nor solenoid 18 rotate when arm 2 is rotated by the operator in opposite directions about pivot 4. Rotational positions of plate 26 and depending arcuate section 28 is shown in FIGS. 2A and 2B respectively.

Figure 2A:
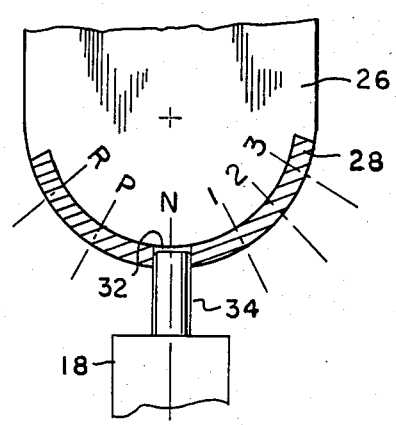
FIG. 2A is an expanded partial view of a portion of the shift control of FIGS. 1A and 1B.
Figure 2B:
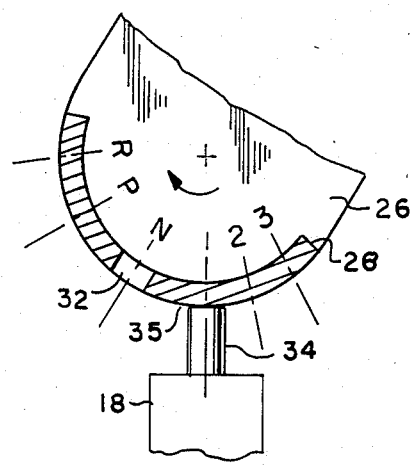
FIG. 2B is an expanded partial view of the portion in FIG. 2A that has been rotated from neutral to a rotational position.

In FIG. 2A, plate 26 is at the neutral position of arm 2 as referenced as "N". At neutral position "N", opening 32 is aligned with pin 34 of actuator means 18. In the condition shown in FIG. 2A, at least a portion of pin 34 is received into opening 32 which aligns with pin 34 when the operator moves arm 2 to the neutral position and the wall of section 28 surrounding opening 32 coacts with pin 34 to prevent arm 2 and plate 26 and section 28 from being moved until the engine speed falls below a value that has been preset.

Reverse ("R"), park ("P"), neutral ("N") and gear positions 1, 2 and 3 are shown in FIGS. 2A and 2B for illustrative purposes. In FIG. 2B, the operator has moved arm 2 to a position corresponding to first gear of the transmission which in turn has caused plate 26 to rotate in the direction shown by the arrow. In order to enable plate 26 to rotate, pin 34 has retracted at least for a distance enabling it to withdraw from opening 32 which retraction has occurred as a result of the engine speed falling below a preset value for example of 900 rpm.

Preferably, pin 34 is biased towards arcuate section 26 and maintains a sliding contacting relationship with surface 35 of section 28 while in the retracted condition as shown in FIG. 2B. In the retracted condition shown in FIG. 2B. Section 28 can be rotated in opposite directions and pin 34 will cross opening 32 but will not enter opening 32 until it assumes the extended condition shown in FIG. 2A when the engine speed climbs above the predetermined value. Thus, in the retracted condition of pin 34, the operator is free to move arm 2 from and through "neutral" from "park" to first gear or vice versa without locking the arm as long as the engine speed remains below the predetermined value and, as soon as the engine speed climbs or remains above the predetermined value, pin 34 becomes extended and enters opening 32 when opening 32 passes pin 34 as shown in FIG. 2A which prevents the operator from shifting for example from "neutral" to any other position or through "neutral" between "park" and first gear or vice versa.

Although the preferred embodiment of the invention features an electrical actuator means such as solenoid 18 fixedly secured to a frame and operably controlling the extended and retracted condition of pin 34 as previously described that remains in sliding contacting relationship with surface 35 of arcuate section 28 which depends from plate 26 and rotates with arm 2 in the manner described, complete retraction of pin 34 away from arcuate surface 35 of section 28 while the engine speed is below the predetermined value is considered within the scope of the invention.

Other component arrangements including the component arrangements of control 70 and control 80 respectively shown FIGS. 3 and 4 which enable pin 34 and opening 32 to coact with each other to prevent movement of arm 2 from or through neutral when the engine speed is above a predetermined value are considered within the scope of the invention.

For example, control 70 of FIG. 3 changes the secured relationship between solenoid 18 and its controlled pin to that of the releasable locking means by securing solenoid 18 to arm 2 by plate 36 which enables solenoid 18 to be carried by and rotate with arm 2 while plate 38 with its depending arcuate section 39 having an opening, not shown, at the netural position is fixedly secured to a frame and remains in a stationary position.

An example where the releasable locking means comprises an opening in arm 2 rather than in an arcuate section such as depending section 28 and 39 previously described is shown in FIG. 4. In FIG. 4, arm 2 of control 80 has an opening 40 therein that passes past pin 34 controlled by solenoid 18 as arm 2 is rotated in opposite directions by the operator. Solenoid 18 is fixedly secured to a frame and stationary while arm 2 is rotated towards and away from the viewer and pin 34 remains in a retracted condition and is not able to enter opening 40 to prevent movement of arm 2 as long as the engine speed remains below a predetermined value but becomes extended for a distance sufficient to enable it to enter opening 40 and prevent arm 2 from being moved from and through the neutral position when the engine speed climbs or remains above the predetermined value.

Although preferably in the form of an opening such as opening 32 of control 60 or opening 39 of control 70 or opening 40 of control 80 which are respectively adapted to receive a pin herein when in an extended condition as previously described, other means of coacting with the pin of the actuator means of the shift control of the invention are included within the scope of this invention where such comprise releaseable locking means adapted to coact with a pin operably controlled by an actuator means that, in an extended condition, prevents the controlling arm to be moved from or through the neutral position as long as the engine speed remains above a predetermined value and, in a retracted condition, enables the arm to be moved from or through the neutral position as long as the engine speed remains below the predetermined value.

An embodiment of electrical circuitry suitable for controlling the extended and retracted condition of a pin operably controlled by an electrical actuator means, preferably in the form of solenoid 18 is shown in FIG. 5. In FIG. 5, engine 42, which may be a vehicular engine, is provided with engine speed sensing means 44 which monitors a continuous electrical signal which is proportional to engine rpm, provided by a rotating signal generator of engine 42. Speed sensing means 44 is connectable to and provides the speed signal to actuating signal means 46 for receiving the speed signal and comparing it to a predetermined speed value and providing a first actuating electrical signal when the engine speed signal is above a predetermined value and a second actuating electrical signal when the engine speed is below the predetermined value.

Signal means 46 is connectable to solenoid 18 which in turn is connectable to a suitable power source "V" through switch 48 as shown in FIG. 5. A vehicle chassis may for example provide the ground return between the power source and speed sensing means 44 to complete the circuit. In vehicular applications, power source "V" may be derived from the vehicle's battery.

Pin 34 is preferably the moveable core element of solenoid 18 which, depending on preference, may be biased to an extended condition when unpowered and retract to a retracted condition when powered or vice versa as is well known to those skilled in the art of solenoids. Thus, for a solenoid where pin 34 is normally in the retracted condition the first electrical actuating signal may operate to close switch 48 and apply power "V" across solenoid 18 which causes it to move pin 34 to the extended condition when the speed signal is above a predetermined value and the second actuating signal may operate to open switch 48 and remove power "V" from solenoid 18 which causes it to retract pin 34 to the retracted condition when the speed signal is below the predetermined value. Alternatively, when pin 34 of solenoid 18 is normally in the extended condition, the first actuating signal may operate to cause solenoid 18 to maintain pin 34 in the extended condition when the speed signal is above the predetermined value and the second actuating signal may operate to cause solenoid 18 to move pin 34 to the retracted condition when the engine speed signal is below the predetermined value.

The speed-sensitive shift control of the invention is especially useful for preventing the operator of a motor vehicle from shifting from and through neutral to engage a gear of the vehicle's transmission when the vehicle's engine speed is above a predetermined value which in turn prevents the operator from engaging gears at an rpm that may lead to damage and costly repair.

What is claimed is:

1. A speed-sensitive shift control for preventing an operator from shifting from and through a neutral position to a shift position engaging the gears of an engine transmission above a predetermined value of engine speed, said control comprising:

a gear selecting control arm moveably mounted to a frame and operably connected to said transmission, said control arm positionable along a plane by the operator from and through said neutral position to said shift position and from said shift position to and through said neutral position for operation of said transmission, means for releasably locking said control arm at the neutral position, said means comprising a locking member having an arcuate surface extending therefrom in a direction substantially transverse to said plane and having an opening therein positioned to engage a pin that maintains a continuous sliding contact relationship with at least a portion of said arcuate surface while in at least a partially retracted condition and which locks the control arm at the neutral position by moving from the partially retracted condition to an extended condition within said opening when the engine speed is above the predetermined value and releases the control arm by disengaging from said opening by moving from said extended condition to said retracted condition when the engine speed is below the predetermined value, an electrical power source, electrical actuator means connectable to the power source and operable upon receipt of a first electrical actuating signal to move said pin from said retracted condition to said extended condition and upon receipt of a second electrical actuating signal to move said pin from said extended condition to said retracted condition, engine speed sensing means operable to sense the engine speed and provide an electrical engine speed signal corresponding thereto, and means for receiving said speed signal and comparing said speed signal to the predetermined value and providing said first actuating signal to the actuator means when the speed signal is above the predetermined value and providing said second actuating signal to the actuator means when the speed signal below the predetermined value.

2. The shift control of claim 1 wherein the locking member is fixedly secured to and is carried by the control arm and the actuator means is fixedly secured to the frame.

3. The shift control of claim 1 wherein the locking member is fixedly secured to the frame and the actuator means is fixedly secured to and carried by the control arm.

4. The shift control of claim 1 wherein the pin maintains a sliding contacting relationship with at least a portion of said arcuate surface when in said retracted condition.

5. The shift control of claim 1 wherein said actuator means is an electrical solenoid and said pin is an extension of a core thereof.

* * * * *